United States Patent
Dong et al.

(10) Patent No.: US 11,847,469 B2
(45) Date of Patent: Dec. 19, 2023

(54) INTELLIGENT DEVICE AND METHOD FOR CONTROLLING BOOT SCREEN OF THE INTELLIGENT DEVICE

(71) Applicant: AMLOGIC (SHANGHAI) CO., LTD., Shanghai (CN)

(72) Inventors: Tao Dong, Shanghai (CN); Lei Qian, Shanghai (CN); Yingwei Long, Shanghai (CN); Zhiwei Gong, Shanghai (CN); Lianghu Su, Shanghai (CN); Siming Chen, Shanghai (CN); Luan Yuan, Shanghai (CN)

(73) Assignee: AMLOGIC (SHANGHAI) CO., LTD.

( * ) Notice: Subject to any disclaimer, the term of this patent is extended or adjusted under 35 U.S.C. 154(b) by 0 days.

(21) Appl. No.: 16/342,455

(22) PCT Filed: Oct. 31, 2018

(86) PCT No.: PCT/CN2018/113138
§ 371 (c)(1),
(2) Date: Apr. 16, 2019

(87) PCT Pub. No.: WO2019/072258
PCT Pub. Date: Apr. 18, 2019

(65) Prior Publication Data
US 2022/0058030 A1    Feb. 24, 2022

(30) Foreign Application Priority Data
Oct. 10, 2017  (CN) .......................... 201710937073.7

(51) Int. Cl.
*G06F 9/4401*  (2018.01)
*G06F 9/54*    (2006.01)

(52) U.S. Cl.
CPC .......... *G06F 9/4411* (2013.01); *G06F 9/4406* (2013.01); *G06F 9/545* (2013.01)

(58) Field of Classification Search
CPC ....... G06F 9/4411; G06F 9/4406; G06F 9/545
See application file for complete search history.

(56) References Cited

U.S. PATENT DOCUMENTS 9,778,937 B1 * 10/2017  Sivertsen ......... H04N 21/44004
9,860,483 B1 *  1/2018  Williams .......... H04N 21/2343
(Continued)

FOREIGN PATENT DOCUMENTS

| CN | 101047804 | 10/2007 |
| CN | 105979340 | 9/2016 |
| CN | 107748687 | 3/2018 |

OTHER PUBLICATIONS

International Search Report for PCT Application No. PCT/CN2018/113138 dated: Jan. 10, 2019.

*Primary Examiner* — Aurel Prifti
(74) *Attorney, Agent, or Firm* — Hovey Williams LLP

(57) ABSTRACT

Embodiments of the invention provide an intelligent device and a method for controlling a boot screen of the intelligent device, applicable to the intelligent device supporting video hardware decompression. The method comprises steps of: completing hardware initialization operation, and storing a preset image in the first storage area, thereby enabling the image layer to display the preset image; starting a system kernel which controls the video driver module, and starting the video layer through the video driver module; reading the corresponding preset image in the first storage area, converting the preset image into video data, and writing the video data into the second storage area, thereby enabling the video layer to display the video data; and starting an application access to the system. During the whole startup process of the intelligent device, the contents displayed on a screen are all seamlessly connected, so that a phenomenon of black screen does not occur.

20 Claims, 3 Drawing Sheets

(56) References Cited

U.S. PATENT DOCUMENTS

| | | | | |
|---|---|---|---|---|
| 2012/0054478 A1* | 3/2012 | Curtis | ............... | G09G 3/20 |
| | | | | 345/659 |
| 2012/0169931 A1* | 7/2012 | Mohapatra | ......... | H04N 21/4432 |
| | | | | 348/563 |
| 2014/0259048 A1* | 9/2014 | Brueck | ............ | H04N 21/262 |
| | | | | 725/32 |
| 2016/0077842 A1* | 3/2016 | Turnock | ............ | G06F 13/10 |
| | | | | 710/10 |
| 2016/0188345 A1* | 6/2016 | Chen | ............... | G06F 9/4403 |
| | | | | 713/2 |
| 2016/0188430 A1* | 6/2016 | Nitta | ............ | G06F 11/2094 |
| | | | | 714/6.3 |
| 2018/0307497 A1* | 10/2018 | Chandrasekaran | ... | G06F 9/4401 |
| 2020/0326955 A1* | 10/2020 | Adiletta | ............ | G06F 1/1684 |

* cited by examiner

INTELLIGENT DEVICE AND METHOD FOR CONTROLLING BOOT SCREEN OF THE INTELLIGENT DEVICE

CROSS REFERENCE TO RELATED APPLICATIONS

This is a National Phase Application pursuant to 37 C.F.R. § 371 of International Application No. PCT/CN2018/113138 filed Oct. 31, 2018, claiming priority to and the benefit of Chinese Patent Application No. 201710937073.7 filed Oct. 10, 2017, each of which is hereby incorporated in its entirety by reference herein.

BACKGROUND OF THE INVENTION

1. Field of the Invention

The invention relates to the field of communication technology, and more particularly, to an intelligent device and a method for controlling a boot screen of the intelligent device.

2. Description of the Related Art

Android is a free operating system based on Linux with open source code, and it is designed primarily for mobile devices, such as smart phones and tablets. Generally, the Android operating system performs startup execution on a device with the android system in three stages, including startup of Boot Loader, kernel (system kernel file) and Android. Specifically, for the startup of Boot Loader, it needs to initialize the device's CPU, DDR, EMMC and other basic hardware modules, and to activate the OSD module (image layer) and other executions. In addition, it takes more than 2 to 3 seconds to guide the startup of Kernel, and it takes more than 5 seconds to initialize a large number of driver modules required for the startup of Kernel. Due to the fact that Boot Loader and Kernel have short startup time and are single-threaded, if a dynamic image is displayed, a corresponding startup time will increase. Therefore, in order to reduce the startup time, a static image is displayed firstly for a transition. After entering the Android stage, since multiple threads can be started, animation can be displayed on the screen without increasing the startup time. When moving from Kernel stage to Android stage, a phenomenon of black screen will last for a period of time at the transitional stage between the static image and the dynamic image. However, the phenomenon of black screen lasts for different periods of time when occurring in different chip platforms, thus, a user's experience is lowered.

SUMMARY OF THE INVENTION

In order to solve the above-mentioned problems during a startup of a device in the prior art, the present invention intends to provide an intelligent device and a method for controlling a boot screen of the intelligent device. By adopting the above-mentioned method, the whole startup process of the intelligent device from screen turn-on to startup completion can be realized, and the contents displayed on a screen of the intelligent device are all seamlessly connected, so that a phenomenon of black screen does not occur.

Detailed technical solutions are as follows:

A method for controlling a boot screen of an intelligent device, applicable to the intelligent device supporting video hardware decompression, wherein the intelligent device comprises an image layer and a video layer activated by a video driver module, the video layer is located below the image layer, and wherein the intelligent device further comprises a first storage area for storing image data displayed by the image layer, and a second storage area for storing video data displayed by the video layer; wherein the method for controlling the boot screen of the intelligent device specifically comprises steps of:

Step S1, completing hardware initialization operation by the intelligent device, and storing a preset image in the first storage area, thereby enabling the image layer to display the preset image;

Step S2, starting a system kernel which controls the video driver module, and starting the video layer through the video driver module;

Step S3, reading the corresponding preset image in the first storage area, converting the preset image into video data, and writing the video data into the second storage area, thereby enabling the video layer to display the video data; and Step S4, starting an application access to the system.

Preferably, the method further comprises providing a graphics library and an interface calling program corresponding to the graphics library, after an application access to the system is started, the method further comprises steps of:

Step S5, guiding the graphics library to close the display of the image layer before entering the initialization;

Step S6, after the graphics library completing the initialization operation, calling the corresponding image data from the graphics library at a predetermined interval by the interface calling program so as to display the image data in the image layer; and clearing the video data displayed in the current video layer when the image layer displays the image data in the graphics library for the first time.

Preferably, in Step S1, the method further comprises steps of:

Step S11, loading a boot loader to a memory of the intelligent device by the intelligent device after the intelligent device is started;

Step S12, executing the boot loader for completing the hardware initialization operation of the intelligent device;

Step S13, loading the obtained kernel code of the system kernel into the memory; and Step S14, the intelligent device entering a startup phase of the system kernel.

Preferably, a conversion algorithm is provided for converting the image data into the video data.

Preferably, the image data is in a bitmap format.

Preferably, the graphics library is OpenGL ES (OpenGL ES (OpenGL for Embedded Systems) graphics library. OpenGL ES is a subset of the OpenGL 3D graphics API and is designed for embedded devices such as mobile phones, PDAs, and game consoles.)

Preferably, in Step S6, the initialization operation is performed in the graphics library by a graphics driver module provided.

Preferably, the intelligent device is a device running an Android system.

An intelligent device, comprising the abovementioned method for controlling a boot screen of the intelligent device, is further provided.

The above-mentioned technical solutions have the beneficial effects that the whole startup process of the intelligent device from screen turn-on to startup completion can be realized, and the contents displayed on a screen of the intelligent device are all seamlessly connected, so that a phenomenon of black screen does not occur.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
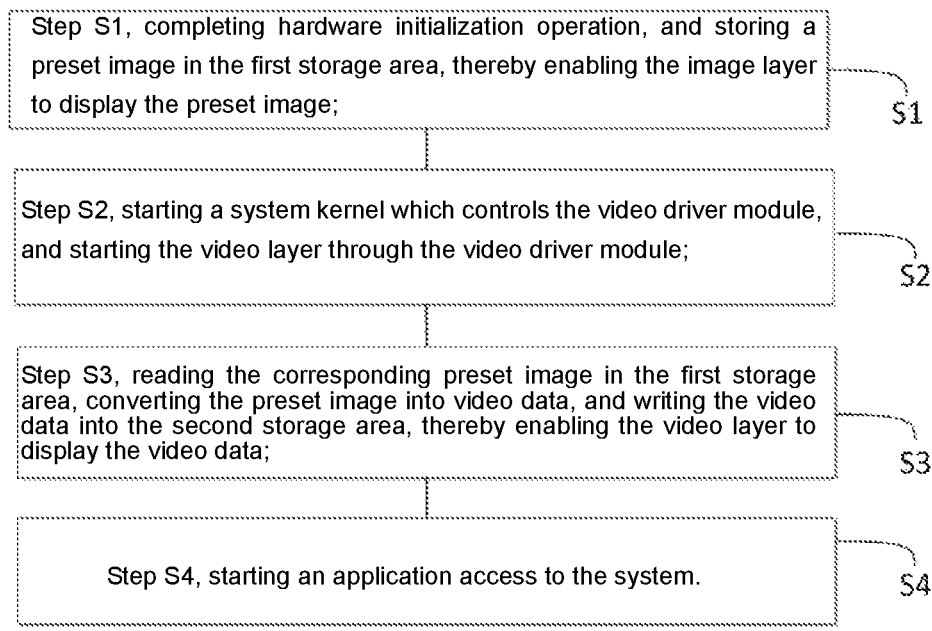
FIG. 1 is a flowchart of an embodiment of a method for controlling a boot screen of an intelligent device.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

In the technical solutions set forth in the present invention, a method for controlling a boot screen of an intelligent device is provided.

The intelligent device includes a processing element described as follows. The processing element may comprise one or more processors. The processing element may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element may generally execute, process, or run instructions, code, code segments, code statements, software, firmware, programs, applications, apps, processes, services, daemons, or the like. The processing element may also include hardware components such as registers, finite-state machines, sequential and combinational logic, and other electronic circuits that can perform the functions necessary for the operation of the current invention. In certain embodiments, the processing element may include multiple computational components and functional blocks that are packaged separately but function as a single unit. The processing element may be in electronic communication with other electronic components through serial or parallel links that include universal busses, address busses, data busses, control lines, and the like. The processing element may be operable, configured, or programmed to perform the following functions by utilizing hardware, software, firmware, or combinations thereof.

As shown in FIG. 1, an embodiment of a method for controlling a boot screen of an intelligent device, applicable to the intelligent device supporting video hardware decompression, wherein the intelligent device comprises an image layer and a video layer activated by a video driver module, the video layer is located below the image layer, and wherein the intelligent device further comprises a first storage area for storing image data displayed by the image layer, and a second storage area for storing video data displayed by the video layer; wherein the method for controlling the boot screen of the intelligent device specifically comprises the steps of:

Step S1, completing hardware initialization operation by the intelligent device, and storing a preset image in the first storage area, thereby enabling the image layer to display the preset image;

Step S2, starting a system kernel which controls the video driver module, and starting the video layer through the video driver module;

Step S3, reading the corresponding preset image in the first storage area, converting the preset image into video data, and writing the video data into the second storage area, thereby enabling the video layer to display the video data; and Step S4, starting an application access to the system.

In the prior art, when moving from Kernel stage to Android stage, a phenomenon of black screen will last for a period of time at the transitional stage between the static image and the dynamic image. The reason why the phenomenon of black screen occurs is that the graphics library will begin the initialization operation when the smart device enters the Android stage, and the image layer will be displayed in black then, that is to say, a black screen is displayed in front of the user during the startup process. After the initialization process of the graphics library is completed, corresponding image data will be displayed in the image layer, and the phenomenon of black screen lasts for a period from the start of the initialization process of the graphics library to the end of the initialization process.

In the present invention, the device begins the hardware initialization operation after being started, and a preset image will be displayed by the image layer then. When starting the system kernel, the system kernel controls the video driver module to activate the video layer, and continues to display the preset image in the video layer. Both the video layer and the image layer located above the video layer displays the content of the preset image, such that a defect that the phenomenon of black screen will last for a certain period of time when a boot image is transformed to a boot animation during the startup process of the existing intelligent terminal will be overcome.

Figure 2:
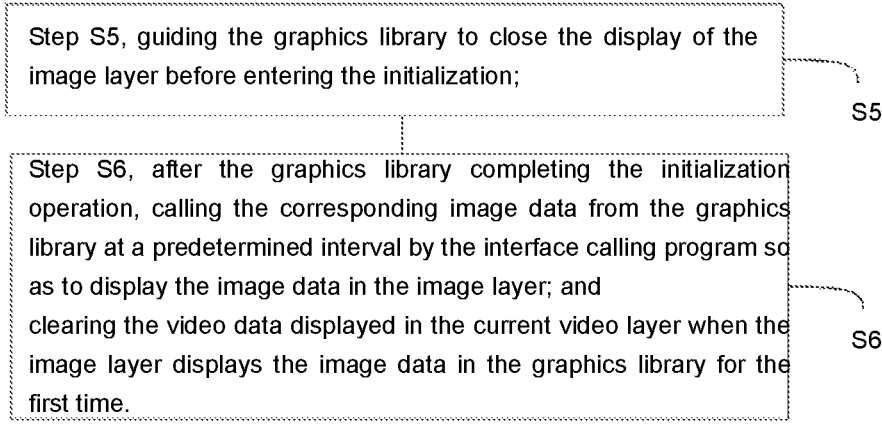
FIG. 2 is a flowchart of a switch of an image layer and a video layer in an intelligent device in an embodiment of a method for controlling a boot screen of an intelligent device.

In a preferred embodiment, as shown in FIG. 2, after an application access to the system is started, the method further comprises the steps of:

Step S5, guiding the graphics library to close the display of the image layer before entering the initialization;

Step S6, after the graphics library completing the initialization operation, calling the corresponding image data from the graphics library at a predetermined interval by the interface calling program so as to display the image data in the image layer; and clearing the video data displayed in the current video layer when the image layer displays the image data in the graphics library for the first time.

In the above-mentioned technical solutions, when entering the system kernel, the graphics library will begin the initialization operation. The preset image displayed in the image layer will stop displaying, and the video layer located below the image layer will continue to display the video data converted from the preset image. In this manner, the image layer may continue to display the preset image, and thus a black screen may occur during the startup process of the intelligent device.

Figure 3:
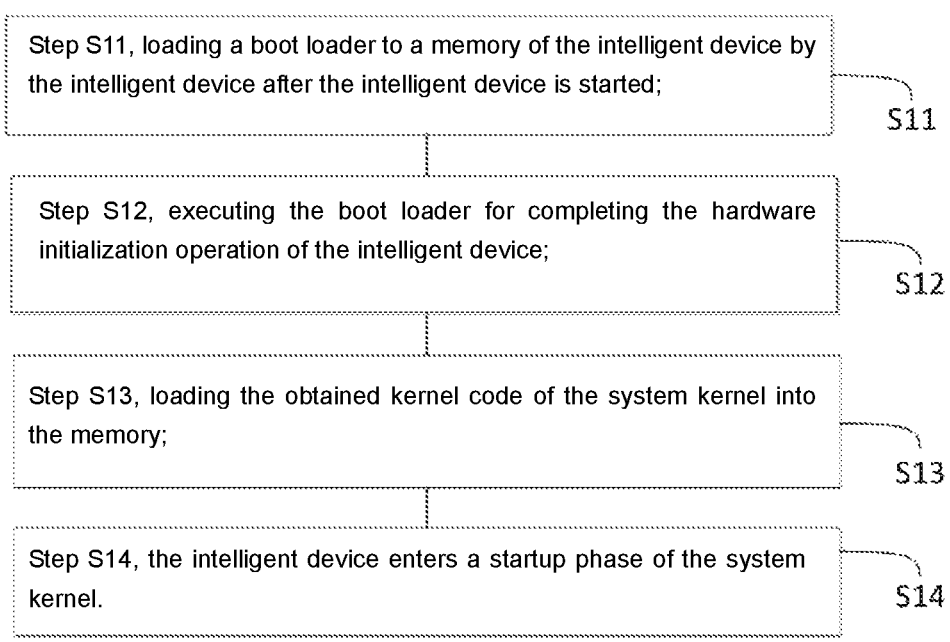
FIG. 3 is a flowchart of a hardware initialization process of a smart device in an embodiment of a method for controlling a boot screen of an intelligent device.

In a preferred embodiment, in Step S1, as shown in FIG. 3, the method further comprises the steps of:

Step S11, loading a boot loader to a memory of the intelligent device by the intelligent device after the intelligent device is started;

Step S12, executing the boot loader for completing the hardware initialization operation of the intelligent device;

Step S13, loading the obtained kernel code of the system kernel into the memory; and Step S14, the intelligent device entering a startup phase of the system kernel.

In the above-mentioned technical solutions, loading Boot Loader and completing the hardware initialization operation for the startup of the intelligent device. During the process, the preset image is displayed by the image layer, and making a preparation for entering the system kernel by loading the kernel code of the system kernel.

In a preferred embodiment, a conversion algorithm is provided for converting the image data into the video data.

In a preferred embodiment, the image data is in a bitmap format. Preferably, bmp (Bitmap) is a standard image file format in the Windows operating system, and can be divided into two categories: Device-Dependent Bitmap (DDB) and Device-Independent Bitmap (DIB), which are widely used in the operating system.

In a preferred embodiment, the graphics library is OpenGL ES graphics library.

In a preferred embodiment, in Step S6, the initialization operation is performed in the graphics library by a graphics driver module provided.

The graphics driver module can be SurfaceFlingger, wherein SurfaceFlingger is a part of Android multimedia, and it is a service in the implementation of Android. Specifically, SurfaceFlingger provides function of a system-wide surface composer, which allows the 2D, 3D surfaces of various applications to be displayed in combination.

In a preferred embodiment, the intelligent device is a device running an Android system.

An intelligent device, comprising the abovementioned method for controlling a boot screen of the intelligent device, is further provided.

The above-mentioned intelligent device may be terminal devices, such as smart phones and tablets based on the Android system.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A method for controlling a boot screen of an intelligent device including a processor, applicable to the intelligent device supporting video hardware decompression, wherein the intelligent device comprises an image layer and a video layer activated by a video driver module, the video layer is located below the image layer, and wherein the intelligent device further comprises a first storage area for storing image data displayed by the image layer and a second storage area for storing video data displayed by the video layer; wherein the method for controlling the boot screen of the intelligent device specifically comprises steps of:

completing hardware initialization operation by the intelligent device, and storing a preset image in the first storage area, thereby enabling the image layer to display the preset image;

starting a system kernel which controls the video driver module, and starting the video layer through the video driver module;

reading the corresponding preset image in the first storage area, converting the preset image into video data, and writing the video data into the second storage area, thereby enabling the video layer to display the video data; and starting an application access to the system.

2. The method for controlling a boot screen of an intelligent device as claimed in claim 1, wherein the method further comprises providing a graphics library and an interface calling program corresponding to the graphics library; after the application access to the system is started, the method further comprises steps of:

guiding the graphics library to close the display of the image layer before entering the initialization;

after the graphics library completing the initialization operation, calling the corresponding image data from the graphics library at a predetermined interval by the interface calling program so as to display the image data in the image layer;

clearing the video data displayed in the current video layer when the image layer displays the image data in the graphics library for the first time.

3. The method for controlling a boot screen of an intelligent device as claimed in claim 1, wherein in the step of completing hardware initialization operation by the intelligent device, and storing a preset image in the first storage area, thereby enabling the image layer to display the preset image, the method further comprises steps of:

loading a boot loader to a memory of the intelligent device by the intelligent device after the intelligent device is started;

executing the boot loader for completing the hardware initialization operation of the intelligent device;

loading the obtained kernel code of the system kernel into the memory; and the intelligent device entering a startup phase of the system kernel.

4. The method for controlling a boot screen of an intelligent device as claimed in claim 1, wherein a conversion algorithm is provided for converting the image data into the video data.

5. The method for controlling a boot screen of an intelligent device as claimed in claim 1, wherein the image data is in a bitmap format.

6. The method for controlling a boot screen of an intelligent device as claimed in claim 2, wherein the graphics library is OpenGL ES graphics library.

7. The method for controlling a boot screen of an intelligent device as claimed in claim 2, wherein the initialization operation is performed in the graphics library by providing a graphics driver module.

8. The method for controlling a boot screen of an intelligent device as claimed in claim 1, wherein the intelligent device is a device running an Android system.

9. An intelligent device comprising a processor for controlling a boot screen of an intelligent device, applicable to the intelligent device supporting video hardware decompression, wherein the intelligent device comprises an image layer and a video layer activated by a video driver module, the video layer is located below the image layer, and wherein the intelligent device further comprises a first storage area for storing image data displayed by the image layer and a second storage area for storing video data displayed by the video layer; wherein the processor is configured to control the boot screen of the intelligent device by:
    completing hardware initialization operation by the intelligent device, and storing a preset image in the first storage area, thereby enabling the image layer to display the preset image;
    starting a system kernel which controls the video driver module, and starting the video layer through the video driver module;
    reading the corresponding preset image in the first storage area, converting the preset image into video data, and writing the video data into the second storage area, thereby enabling the video layer to display the video data; and
    starting an application access to the system.

10. The intelligent device as claimed in claim 9, wherein the processor is further configured to perform the step of providing a graphics library and an interface calling program corresponding to the graphics library; after the application access to the system is started, the processor is further configured to perform the steps of:
    guiding the graphics library to close the display of the image layer before entering the initialization;
    after the graphics library completing the initialization operation, calling the corresponding image data from the graphics library at a predetermined interval by the interface calling program so as to display the image data in the image layer;
    clearing the video data displayed in the current video layer when the image layer displays the image data in the graphics library for the first time.

11. The intelligent device as claimed in claim 9, wherein in the step of completing hardware initialization operation by the intelligent device, and storing a preset image in the first storage area, thereby enabling the image layer to display the preset image; the processor is further configured to perform the steps of:
    loading a boot loader to a memory of the intelligent device by the intelligent device after the intelligent device is started;
    executing the boot loader for completing the hardware initialization operation of the intelligent device;
    loading the obtained kernel code of the system kernel into the memory; and
    the intelligent device entering a startup phase of the system kernel.

12. The intelligent device as claimed in claim 9, wherein a conversion algorithm is provided for converting the image data into the video data.

13. The intelligent device as claimed in claim 9, wherein the image data is in a bitmap format.

14. The intelligent device as claimed in claim 9, wherein the graphics library is OpenGL ES graphics library.

15. The intelligent device as claimed in claim 10, wherein the initialization operation is performed in the graphics library by providing a graphics driver module.

16. The intelligent device as claimed in claim 9, wherein the intelligent device is a device running an Android system.

17. The method for controlling a boot screen of an intelligent device as claimed in claim 1, wherein the method further comprises providing a graphics library and an interface calling program corresponding to the graphics library; after the application access to the system is started, the method further comprises step of:
    guiding the graphics library to close the display of the image layer before entering the initialization.

18. The method of claim 17, further comprising the step of:
    after the graphics library completing the initialization operation, calling the corresponding image data from the graphics library at a predetermined interval by the interface calling program so as to display the image data in the image layer.

19. The intelligent device as claimed in claim 9, wherein the processor is further configured to perform the step of providing a graphics library and an interface calling program corresponding to the graphics library; after the application access to the system is started, the processor is further configured to perform the step of:
    guiding the graphics library to close the display of the image layer before entering the initialization.

20. The intelligent device as claimed in claim 19, wherein the processor is further configured to perform the step of:
    after the graphics library completing the initialization operation, calling the corresponding image data from the graphics library at a predetermined interval by the interface calling program so as to display the image data in the image layer.

* * * * *